Jan. 24, 1956  F. W. SAMPSON  2,731,813
UNIVERSAL JOINT

Original Filed Dec. 6, 1949  2 Sheets-Sheet 1

INVENTOR.
Frederick W. Sampson
BY
Willits Hardman
Attorney

Jan. 24, 1956  F. W. SAMPSON  2,731,813
UNIVERSAL JOINT

Original Filed Dec. 6, 1949  2 Sheets-Sheet 2

INVENTOR.
Frederick W. Sampson
BY
Willets Hardman
Attorney

:::::::::::::::::::::::::::::::::::::::::::::::::::::::::::::::::::::::::::::::::::::::::::::::::::::::::::::::::

United States Patent Office 2,731,813
Patented Jan. 24, 1956

2,731,813

UNIVERSAL JOINT

Frederick W. Sampson, Dayton, Ohio, assignor to General Motors Corporation, Detroit, Mich., a corporation of Delaware Original application December 6, 1949, Serial No. 131,287, now Patent No. 2,628,416, dated February 17, 1953. Divided and this application July 23, 1952, Serial No. 306,465

1 Claim. (Cl. 64—11)

This invention relates to universal joints for transmitting torque from a driving member to a driven member at substantially the same angular velocity at all times, even when the axes of said driving and driven members are non-aligned.

This is a division of application Serial Number 131,287, filed December 6, 1949, and which is now Patent Number 2,628,416, issued February 17, 1953.

An object of this invention is to provide an improved universal joint wherein the torque is transmitted thru a cushioning non-metallic material, such as resilient natural or synthetic rubber, which prevents metal to metal contact between the driving and driven members.

Important features of the universal joint of this invention include the following. The resilient non-metallic material (which hereinafter will be referred to simply as "rubber") is permanently retained compressed and distorted out of its original molded shape in a particular manner within the intervening space between an inner metal ball member and a surrounding confining spherical shell member substantially concentric with said ball member. The outer shell member is made in two parts divided substantially at the transverse plane thru the center of its spherical surface. The rubber material is molded to shape in situ and bonded to the outer and inner spherical surfaces of said inner and outer members while the two parts of said outer member are temporarily located axially separated from their final positions. Thereafter the two parts of said outer shell member are forced together in an axial direction and fixed in their final concentric positions to permanently compress the rubber material and materially reduce its radial thickness and force it to bulge outwardly at the unconfined end areas thereof. This distortion of the rubber material out of its original molded shape stresses the rubber in such way as to highly resist translation displacement in any direction of the inner ball member out of concentricity with the outer shell member during use of the joint, but at the same time will permit relatively easy pivoting between said two members as the axes thereof move out of alignment.

Further objects and advantages of the present invention will be apparent from the following description, reference being had to the accompanying drawings wherein a preferred embodiment of the present invention is clearly shown.

In the drawings:

Figs. 1 and 2 illustrate a method of molding the rubber material in a vulcanizing mold and simultaneously bonding it to the three main universal joint members which are located as inserts in the mold cavity. Fig. 1 is a vertical section thru the center line of the mold and joint members. Fig. 2 is a transverse section taken on line 2—2 of Fig. 1.

Figs. 3 and 4 show the molded assembly as it comes from the mold of Fig. 1. Fig. 3 is a longitudinal view of the molded assembly taken on line 3—3 of Fig. 4. Fig. 4 is a transverse view taken on line 4—4 of Fig. 3.

Similar reference characters refer to similar parts thruout the drawings.

Figure 2:
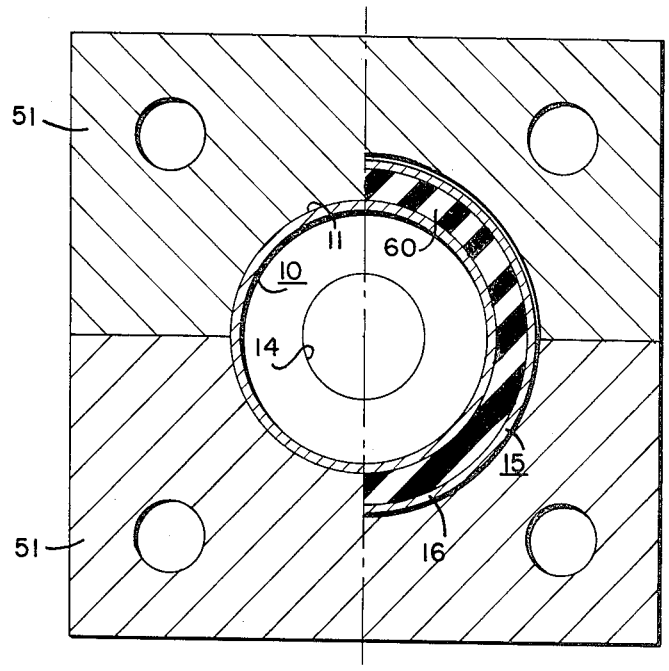

The inner metal ball member 10 has a spherical head 11 and a projecting cylindrical portion 12 adapted to fit upon and be fixed to a shaft 13 (shown in dot-dash lines in Fig. 6) by welding. The spherical head 11 may have an open outer end 14 beyond the point where it comes into contact with the rubber material, in order to facilitate manufacture thereof.

Figure 6:
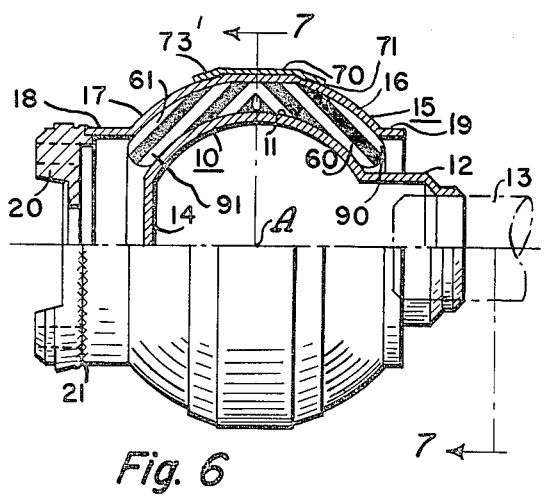
Fig. 6 shows the fully assembled universal joint and is taken on line 6—6 of Fig. 7. The shaft fixed to the inner joint member is shown in dot-dash lines.
Figure 7:
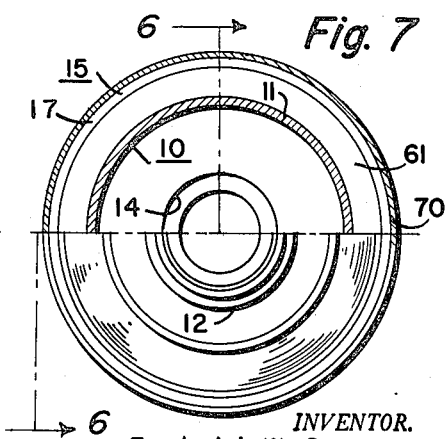
Fig. 7 is a transverse view of the joint taken on line 7—7 of Fig. 6.

The outer metal shell 15 is made in two halves 16 and 17 divided on a transverse plane passing thru the center of the inner spherical head 11 as shown in Fig. 6. Each half 16 and 17 has a substantially spherical surface in contact with the rubber material and after said halves 16 and 17 are forced into their final positions shown in Fig. 6 the spherical surfaces of the outer shell 15 and inner spherical head 11 are concentric. In the form shown, the half 17 opposite to shaft 13 is provided with a projecting cylindrical portion 18 which is suitably fixed to an adapter ring 20 as by welding at 21. This adapter ring 20 is designed to be drivingly fixed, as by cap screws or bolts, to the other rotating torque-carrying member opposite shaft 13. In the form shown, shaft 13 represents the propeller shaft of an automobile and adapter ring 20 represents the means by which the outer shall 15 is fixed to either the driving member of the transmission (when the joint is used at the front end of the propeller shaft) or the driven member of the differential (when the joint is used at the rear end of the propeller shaft). In either case the power torque is transmitted thru the rubber material from the outer shell 15 to the inner ball 10 or vice versa, dependent upon whether the outer shell 15 is the driving member or the driven member.

An essential feature of this invention is the particular sort of distortion under which the rubber material is held when there is no angularity between the axes of the driving and driven members. In order to obtain this peculiar distortion, the rubber is molded and vulcanized to the inner ball member 10 and the two halves 16 and 17 of the outer shell 15 while these three parts are in the relative positions shown in Fig. 3. Thereafter the two halves 16 and 17 are forced in an axial direction into abutting relationship and permanently fixed in this position, whereat the spherical surfaces of said halves 16 and 17 are concentric with the spherical surface 11 of ball member 10.

Figure 1:
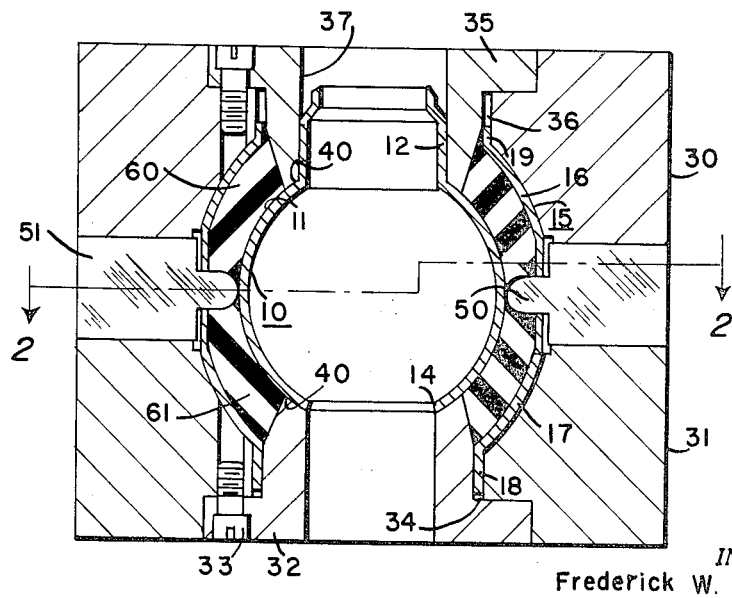
Figure 3:
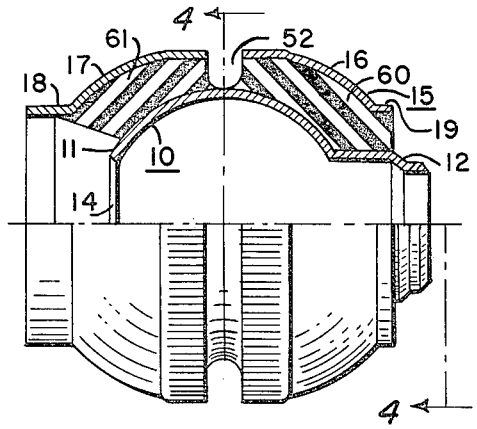
Figure 4:
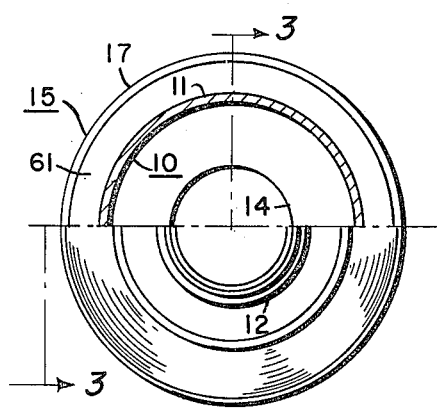

The molded unit shown in Fig. 3 may be obtained by locating the two halves 16 and 17 of the outer shell 15 and ball member 10 as inserts in the vulcanizing mold as clearly shown in Figs. 1 and 2. The upper and lower mold halves 30 and 31 may be duplicates if so desired. Lower mold half 31 is provided with a removable annular end closure 32 rigidly fixed thereto by suitable cap screws 33, of such design as to leave an annular groove 34 in which the cylindrical portion 18 of outer shell half 17 snugly fits. Similarly upper mold half 30 has a removable annular end closure 35 fixed thereto of such design as to leave an annular groove 36 in which the short cylindrical portion 19 of outer shell half 16 snugly fits. The inner annular end surfaces 40 of both end closures 32 and 35 are spherical and fit snugly against the spherical surface 11 of inner ball member 10. Also the inside bore 37 of the upper end closure 35 fits snugly over the projecting cylindrical portion 12 of ball member 10. Thus the inner ball member 10 is rigidly located as an insert in the mold cavity. The two shell halves 16 and 17 are held spaced apart at the transverse center line of Fig. 1, by the annular inward projection 50 which is formed integral with the two halves of the symmetrically divided separator plate 51 which lies between the mold halves 30 and 31. Separator plate 51 is divided thru its center line in order that its two halves may be withdrawn laterally from the molded unit shown in Fig. 3 to remove same after the molding operation is completed and the mold halves 30 and 31 are separated. As will be clear from Fig. 1 the annular projection 50 also molds a correspondingly shaped annular groove 52 (see Fig. 3) in the molded rubber and substantially divides the molded rubber into two axially spaced symmetrical rings 60 and 61, each having a normal unstressed cross section as shown in Figs. 1 and 3 prior to being distorted as hereinafter described.

Figure 5:
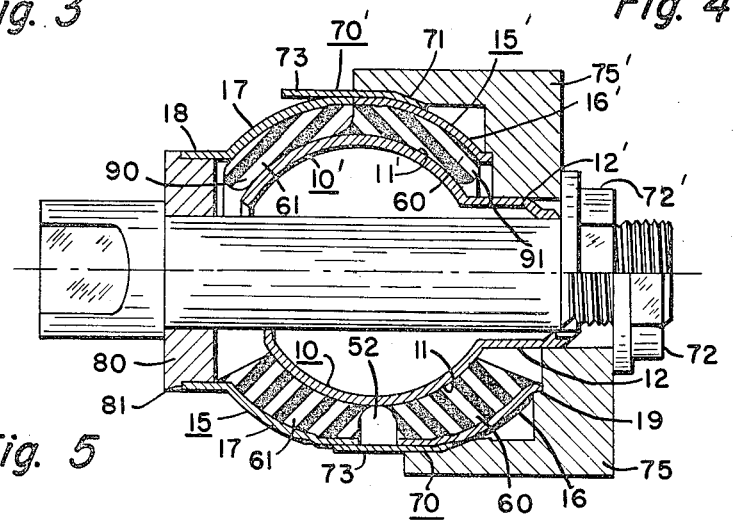
Fig. 5 illustrates a method of compressing the unit shown in Fig. 3 to stress the rubber material and finally assemble the parts. The lower half of Fig. 5 shows the parts in position prior to compressing the rubber, and the upper half of Fig. 5 shows the parts in position after compressing the rubber by forcing together the two halves of the outer shell.

The unit shown in Fig. 3 is next set upon a spinning arbor with the snugly fitting retainer ring 70 (previously formed as shown at 71 on one side thereof) telescoped thereupon as shown in the lower half of Fig. 5. Then the two outer shell halves 16 and 17 are forced axially toward one another by screwing up the large arbor unit 72 until they abut at the transverse center line of the unit and their spherical surfaces are brought into concentricity with spherical surface 11 of ball member 10. The lower half of Fig. 5 shows all the parts in their open positions prior to outer shell halves 16 and 17 being forced toward each other by the annular slidable arbor member 75 which is forced to position 75' by arbor nut 72. The upper half of Fig. 5 shows the parts in their final positions after nut 72 has been screwed home to position 72' to force outer shell half 16 to position 16' and inner ball member 10 to position 10'. The outer shell half 17 is held stationary by its cylindrical portion 18 abutting shoulder 81 of the arbor collar 80 and takes the compressing force exerted by arbor nut 72. While the parts are held forced together in the positions shown in the upper half of Fig. 5 the projecting lip 73' of retainer ring 70 is bent inwardly preferably by a spinning operation, to its final position shown at 73' in Fig. 6 to thereby retain the outer shell halves 16 and 17 rigidly fixed together in mutually abutting relation.

The two axially spaced resilient rubber rings 60 and 61 are molded to the shape shown in Figs. 1 and 3 and bonded to the contacting metal surfaces of members 10, 16 and 17. Rubber rings 60 and 61 are radially compressed and each is bulged outwardly around spherical surface 11 of ball 10 at its two unconfined end areas to its final distorted shape shown in Fig. 6 and the upper half of Fig. 5, when the outer shell halves 16 and 17 are forced together as above described. The radial compression upon the rubber material is symmetrical about ball 10 hence ball 10 is urged with a high force into concentricity with outer shell 15 at all times during use of the joint. This feature will maintain ball 10 and outer shell 15 practically mutually centered during operation of the universal joint, and obviously these two members will rotate at practically the same angular velocity thruout the 360 degrees of each revolution even when the longitudinal axes of said two members are out of alignment.

In operation of the joint, when shaft 13 swings in any direction out of alignment with the axis of shell 15 the consequent oscillatory partial rotation of ball 10 about its center relative to the outer shell 15 is taken by an internal shearing distortion inside the rubber material without any substantial tendency to pull the rubber loose from its contacting metal surfaces. Such internal shearing distortion is not concentrated at any particular point or surface in the rubber material but takes place thruout the radial thickness thereof, which greatly reduces the maximum stress on the rubber material. The above described internal shearing distortion in the rubber is further greatly facilitated by the permanent radial compression upon the rubber material due to the fact that such material when substantially compressed yields more readily by internal shear in a direction at right angles to the compressing force. In this particular case the internal shear always occurs at right angles to the radial compressing force upon the rubber rings 60 and 61 thruout the spherical body thereof though in a somewhat different manner in different portions of the spherical rubber body.

For instance, when shaft 13 is swung in the plane of the paper as viewed in Fig. 6 the internal shear in the rubber occurs in a direction peripherally of ball 10 in the particular vertical plane shown in Fig. 6. At the same time, in the horizontal plane (perpendicular to the paper as viewed in Fig. 6) the internal shear in the rubber occurs as a circular twist centered about the axis "A" in Fig. 6, but the direction of such circular twisting at all points thereof is nevertheless at right angles to the radial compressing force upon the rubber.

Obviously any swinging of shaft 13 out of alignment with the axis of outer shell 15 is accompanied by a combination of the two kinds of internal shearing distortion described in the preceding paragraph. Since both such kinds of internal shearing distortion occur in a direction at right angles to the radial compressing force upon the rubber, it will now be clear that any such swinging of shaft 13 out of alignment with the axis of outer shell 15 is taken by an internal shearing distortion in the rubber which is always at right angles to the radial compression upon the rubber. Thus the rotary oscillation of ball 10 relative to outer shell 15 is greatly facilitated and will not be materially resisted by the oscillatory shearing distortion which takes place within the rubber material. In other words, such oscillatory shearing distortion does relatively little work upon the rubber material, consequently the rubber material will not heat up excessively during use but can readily absorb such slight amount of work and the resulting heat will be readily conducted away by the contacting metal parts and be lost to the surrounding air.

It will be noted (see Figs. 5 and 6) that the radial compression upon rubber rings 60 and 61 flattens out the radial depth of the rubber material and causes it to bulge out laterally at the unconfined end areas thereof. This causes the rubber material to partially or completely fill the central peripheral molded groove 52 therein (see Fig. 3) to the desired extent, dependent upon the degree of radial compression and the dimensions of the outer shell 15 and inner ball 10. At the unconfined annular end areas 90 and 91 the rubber is forced to bulge outwardly (as shown in Fig. 6) from its original molded shape shown in Fig. 3. The rubber of course tends to return to its original molded shape, thus even though the central portions of rubber rings 60 and 61 are under a permanent high radial compression the rubber fibers extending around the bulges at 90 and 91 have been necessarily considerably stretched and are maintained under a permanent tension. This tension is sufficiently high to substantially prevent any further outward bulging of the rubber at these end areas 90 and 91 and hence highly resist any force tending to displace inner ball 10 out of concentricity with outer shell 15. During the oscillatory partial rotation of ball 10 relative to shell 15 described above, the distortion of the rubber bulges at end areas 90 and 91 is not materially changed because these bulges obviously are capable of a sort of rolling action between the adjacent metal surfaces.

Power torque is resiliently transmitted from the outer shell 15 to the inner ball 10, or vice versa, by an internal shearing stress throughout the body of rubber rings 60 and 61, which shearing stress of course extends around said rings in the circular direction of the torque. Since the rubber is strongly bonded by vulcanization to the contacting metal surfaces of shell 15 and ball 10 and is also highly compressed against said metal surfaces, this joint is capable of carrying a relatively great torque load for its size. The degree of hardness or softness of the resilient rubber rings 60 and 61 may be varied as desired to suit the particular working conditions under which the joint is used. The term "rubber" as used herein is intended to include vulcanizable compounds of natural or synthetic rubbers or other resilient material having similar physical characteristics.

While the embodiment of the present invention as herein disclosed, constitutes a preferred form, it is to be understood that other forms might be adopted.

What is claimed is as follows:

A universal joint comprising an inner spherical torque member having a projecting cylindrical portion extending axially outwardly, a two-part outer spherical torque member, each part having a pair of coaxially spaced flanges, a flange on each part of said outer spherical torque member coacting with a corresponding flange of said other part to define a cylindrical juncture, an intermediate resilient spherical segment bonded to each of said torque members and contacting at said cylindrical juncture, each of said segments being under tension in a direction tending toward separation of said torque members, a clamping ring extending around said cylindrical juncture, said inner and outer members and said clamping ring cooperating to retain said resilient material under tension, said resilient material extending at least partially within said flanges whereby said torque members are contained in a concentric relationship.

References Cited in the file of this patent

UNITED STATES PATENTS

| | | |
|---|---|---|
| 1,940,884 | Rosenberg | Dec. 26, 1933 |
| 2,126,708 | Schmidt | Aug. 16, 1938 |

FOREIGN PATENTS

| | | |
|---|---|---|
| 484,877 | Great Britain | 1938 |